(12) United States Patent
Twelves, Jr. et al.

(10) Patent No.: US 10,639,864 B2
(45) Date of Patent: May 5, 2020

(54) SURFACE GEOMETRY FOR ADHESIVE BONDING OF POLYMER COMPONENTS

(71) Applicant: United Technologies Corporation, Farmington, CT (US)

(72) Inventors: Wendell V. Twelves, Jr., Glastonbury, CT (US); Evan Butcher, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 186 days.

(21) Appl. No.: 15/479,401

(22) Filed: Apr. 5, 2017

(65) Prior Publication Data

US 2018/0290423 A1 Oct. 11, 2018

(51) Int. Cl.
| | |
|---|---|
| *B32B 3/10* | (2006.01) |
| *B32B 3/30* | (2006.01) |
| *B29C 65/00* | (2006.01) |
| *B29C 65/56* | (2006.01) |
| *B29C 65/72* | (2006.01) |
| *B29C 65/48* | (2006.01) |
| *B32B 7/12* | (2006.01) |
| *B32B 27/06* | (2006.01) |
| *B33Y 80/00* | (2015.01) |
| *B29C 65/60* | (2006.01) |

(Continued)

(52) U.S. Cl.
CPC ............... *B32B 3/30* (2013.01); *B29C 65/483* (2013.01); *B29C 65/56* (2013.01); *B29C 65/72* (2013.01); *B29C 66/1122* (2013.01); *B29C 66/124* (2013.01); *B29C 66/126* (2013.01); *B29C 66/21* (2013.01); *B29C 66/232* (2013.01); *B29C 66/30321* (2013.01); *B29C 66/30325* (2013.01); *B29C 66/322* (2013.01); *B29C 66/45* (2013.01); *B29C 66/50* (2013.01); *B32B 7/12* (2013.01); *B32B 27/06* (2013.01); *B29C 65/006* (2013.01); *B29C 65/08* (2013.01); *B29C 65/4865* (2013.01); *B29C 65/4895* (2013.01); *B29C 65/606* (2013.01); *B29C 66/12425* (2013.01); *B29C 66/24221* (2013.01); *B29C 66/24244* (2013.01); *B29C 66/71* (2013.01); *B29C 69/00* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 6,406,636 | B1 | 6/2002 | Vaganov |
| 7,341,330 | B2 | 3/2008 | Silverbrook |

(Continued)

FOREIGN PATENT DOCUMENTS

EP 3162470 A1 5/2017

OTHER PUBLICATIONS

Extended European Search Report for Application No. 18162516.1, dated Aug. 6, 2018, 8 pages.

*Primary Examiner* — Christopher M Polley
(74) *Attorney, Agent, or Firm* — Kinney & Lange, P.A.

(57) ABSTRACT

A method of joining polymer components includes additively manufacturing first and second mating features on first and second polymer components such that a mechanical lock is created through undercut geometric features of an adhesive material when the polymer components are joined. Adhesive is added between the mating components to strengthen the joint.

4 Claims, 6 Drawing Sheets

(51) Int. Cl.
    *B29C 65/08*         (2006.01)
    *B29C 69/00*         (2006.01)

(56) References Cited

U.S. PATENT DOCUMENTS

| | | |
|---|---|---|
| 8,741,090 B2 | 6/2014 | Goehlich et al. |
| 2009/0085257 A1* | 4/2009 | Yang .................. B29C 65/48 |
| | | 264/401 |
| 2016/0160353 A1 | 6/2016 | Miarecki et al. |
| 2016/0272295 A1* | 9/2016 | Benthien .................. B32B 3/26 |

* cited by examiner

Fig. 6

SURFACE GEOMETRY FOR ADHESIVE BONDING OF POLYMER COMPONENTS

BACKGROUND

The disclosure relates generally to additive manufacturing techniques, and specifically to bonding two or more polymer components.

In additive manufacturing processes, creating a strong bond between two polymer components can be problematic due to relatively low surface energies of the polymer components. Industry standards employ methods such as solvents, diffusion techniques, heat staking, cross-linking, and ultrasonic welding. However, these techniques are both expensive and time consuming.

Instead, many methods employ simple adhesive methods, such as epoxy, olefin, or methacrylate. Adhesive-based bonds between polymer components, while inexpensive, have marginal adhesion and are generally low strength bonds. Adhesive-based polymer bonds can be aggravated by surface contaminates such as grease, processing debris, dirt, or oil. Thus, adhesive-based bonds between polymer components are generally weak and can weaken over time.

Some techniques use surface preparation, such as plasma etching, exposure to an open flame, or acid etching. These surface preparation techniques can help to some degree, but these processes further add cost to the method and will degrade over time, resulting in a weak bond between polymer components. There is no simple, affordable method that creates improved performance of adhesively bonded polymer joints.

SUMMARY

A method of bonding polymer components includes additively manufacturing a first polymer component having a first mating feature, additively manufacturing a second polymer component having a second mating feature, the second mating feature designed to fit with the first mating feature, and joining the first and second polymer components with an adhesive to form a mechanical lock wherein the mechanical lock comprises the first mating feature, the second mating feature and the adhesive.

A polymer article includes a first polymer component having a first surface and an edge, the first polymer component comprising a first mating feature on the first surface, a second polymer component having a second surface and an edge, the second polymer component comprising a second mating feature on the second surface, and a mechanical lock between the first polymer component and the second polymer component including. The mechanical lock includes the first mating feature fitted to the second mating feature by an adhesive.

DETAILED DESCRIPTION

Adhesive-based bonds between polymer components can be strengthened through mechanical locks. Appropriately shape features on surfaces of the polymer components can enhance the bond strength and integrity by creating mechanical locks that work in conjunction with an adhesive. These surface shapes can also distribute stressors on edges of polymer components that would normally cause peeling at a bond site.

Figure 1A:
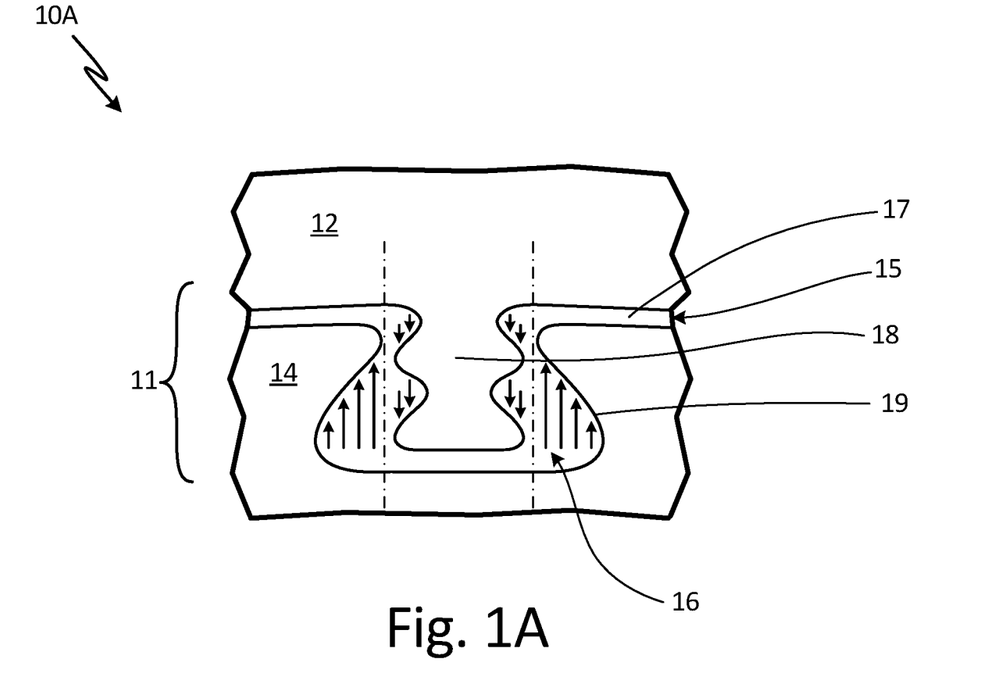
FIGS. 1A-1B are schematic drawings of a mechanical lock bond between two polymer components in different embodiments.
Figure 1B:
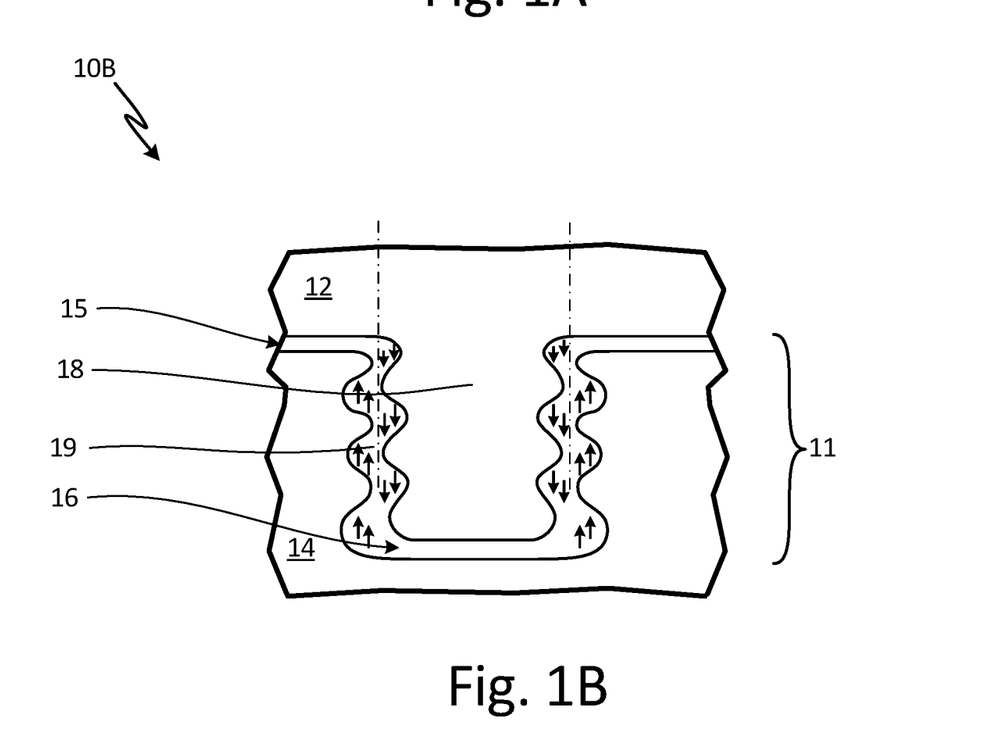

FIGS. 1A-1B are schematic drawings of a mechanical lock bond between two polymer components in different embodiments. In article 10A of FIG. 1A, bond 11 connects first polymer component 12 and second polymer component 14. Polymer components 12, 14 are made through additive manufacturing or 3-D printing techniques, and have low surface energy. Surface energy determines the strength of adhesive attractions. The higher the surface energy, the stronger the adhesive bond, and the closer a substrate material draws an adhesive to it. The lower the surface energy, the weaker the attractive forces in the adhesive bond. Surface free energy for polymers difficult to adhesively bond can range between −0.04 mN/m for polycarbonate to −0.62 mN/m for polyhexylmethacrylate.

Bond 11 in FIG. 1A is an adhesive bond enhanced by a mechanical lock. Bond 11 includes adhesive gap 15 between two mating features: insert feature 16 and protruding feature 18. Adhesive gap 15 is filled by adhesive 17. Adhesive 17 is an epoxy, olefin, or methacrylate used to fill adhesive gap 15 between first polymer component 12 and second polymer component 14. Adhesive 17 can be a neat adhesive (without a filler material) or a reinforced adhesive (such as an epoxy with a filler material to enhance adhesive properties).

Polymer components 12 and 14 have low surface energy. This makes adhesive bonds between components 12 and 14 problematic and susceptible to weakening. Protruding feature 18 and insert feature 16 create a mechanical lock in bond 11 that works in conjunction with adhesive 17 to hold together polymer components 12 and 14. Protruding feature 18 and insert feature 16 have undercut features 19 which provide more stability to the mechanical lock.

Undercut features 19 can have a variety of shapes, such as corrugated walls, dovetail shapes, or helical threads. In FIGS. 1A-1B, features 16, 18, are nested mating features with undercut walls that create a mechanical lock. The use of insert feature 16 allows bond 11 to benefit from a mechanical lock in addition to an adhesive when joining polymer components 12 and 14. Features 16 and 18 can be tailored to address tension, shear, torsion, and edge peel present in joints between polymer components 12 and 14. FIG. 1B shows bond 11, that is similar to bond 11 in FIG. 1A, but increases the number of grooves in undercut feature 19 on insert feature 16.

When features grown with additive manufacturing, such as features 16 and 18, are added to components 12, 14 of article 10, the strength of the bond between components 12 and 14 is strengthened through a mechanical lock. The complex undercut wall structure of undercut features 19 create more surface area for adhesive 17 to bond to, strengthening the adhesive bond in addition to providing a mechanical lock to counteract shear forces.

The mechanical lock of FIGS. 1A-1B is made through an additive manufacturing or 3-D printing technique. As polymer components such as 12 and 14 are created through normal additive manufacturing processes, undercut features can be directly grown on polymer components.

Figure 2A:
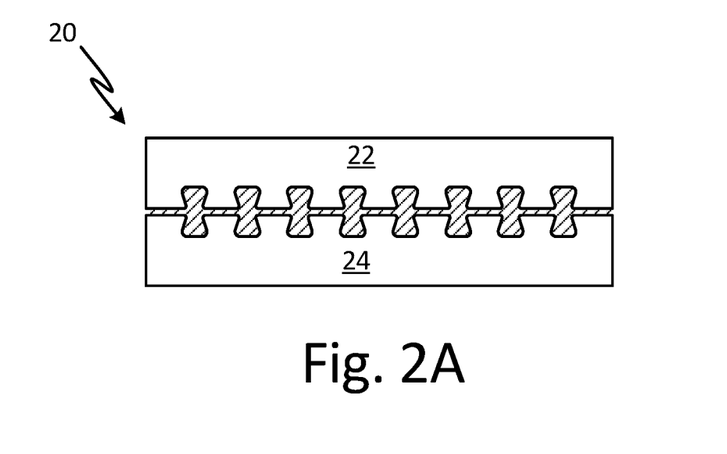
FIGS. 2A-2B are schematic drawings of recessed undercuts on two polymer components creating a mechanical lock bond.
Figure 2B:
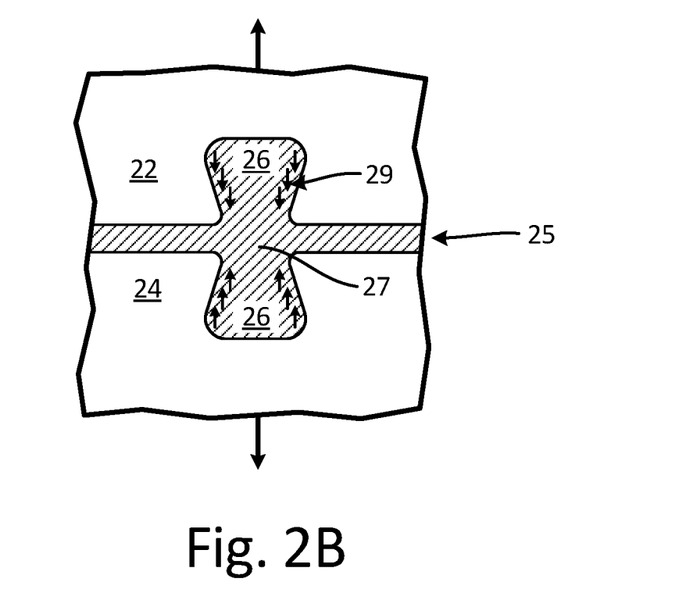

FIGS. 2A-2B are schematic drawings of recessed undercuts on two polymer components creating a mechanical lock bond. In article 20 of FIGS. 2A-2B, recessed feature 26 is present on both first polymer component 22 and second polymer component 24. Recessed features 26 create a mechanical lock between polymer components 22, 24, and are both filled with adhesive 27. When adhesive 27 is cured, it creates a mechanical lock in conjunction with features 26. Undercuts used to create a mechanical lock, such as undercuts 29 in recessed feature 26, can be linear or curved, and may follow a planar or non-planar surface. Additionally, a radius feature on external edges or internal corners of undercut grooves can be created to further mitigate stress concentrations on adhesive materials and polymer components.

Mating features creating mechanical locks can include recessed features, such as grooves and void spaces in conjunction with protruding features, such as pins and blades. Various embodiments of these undercut features are illustrated in FIGS. 3-5.

Figure 3A:
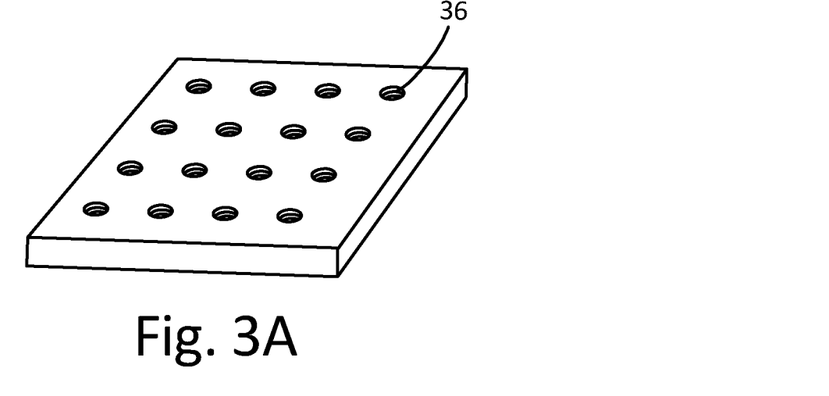
FIGS. 3A-3C are schematic drawings of a mechanical lock bond between two polymer components in a pinhole configuration.
Figure 3B:
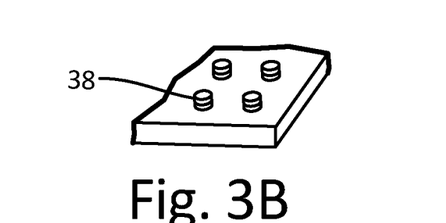
Figure 3C:
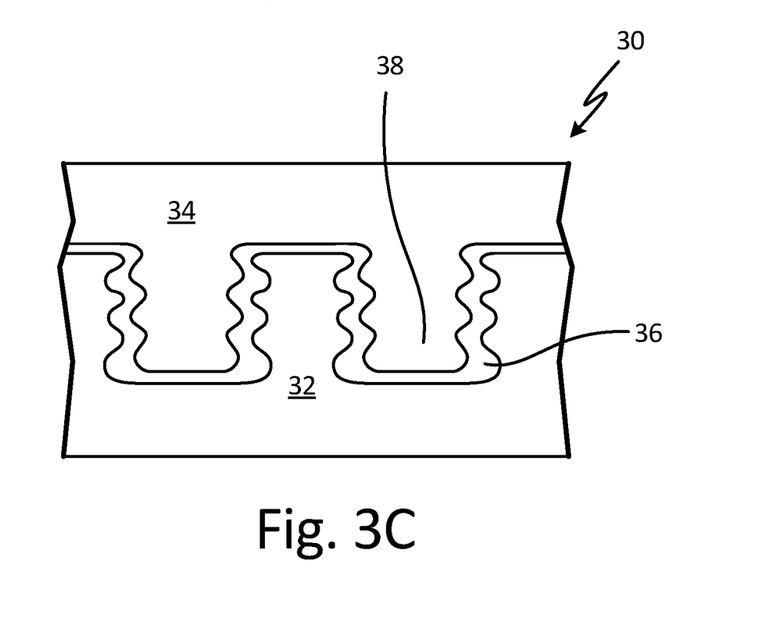

FIGS. 3A-3C are schematic drawings of a mechanical lock in the polymer article 30 bond between first polymer component 32 and second polymer component 34, in a pinhole configuration. First polymer component 32 contains a mating feature in the form of void spaces 36. Second polymer component 34 contains a different mating feature in the form of protruding pins 38 which are fitted to void spaces 36 on first polymer component 32. Void spaces 36 and pins 38 are created through additive manufacturing or 3-D printing. Both pins 38 and void spaces 36, contain complex wall undercut structures. The complex wall undercut structures can be linear or curved grooves, spiral patterns, corrugated walls, dovetail shaping, or helical threads. The array of pins 38 fitted in void spaces 36, as shown in FIG. 3C, creates a mechanical lock between an adhesive and polymer components 32, 34.

Figure 4A:
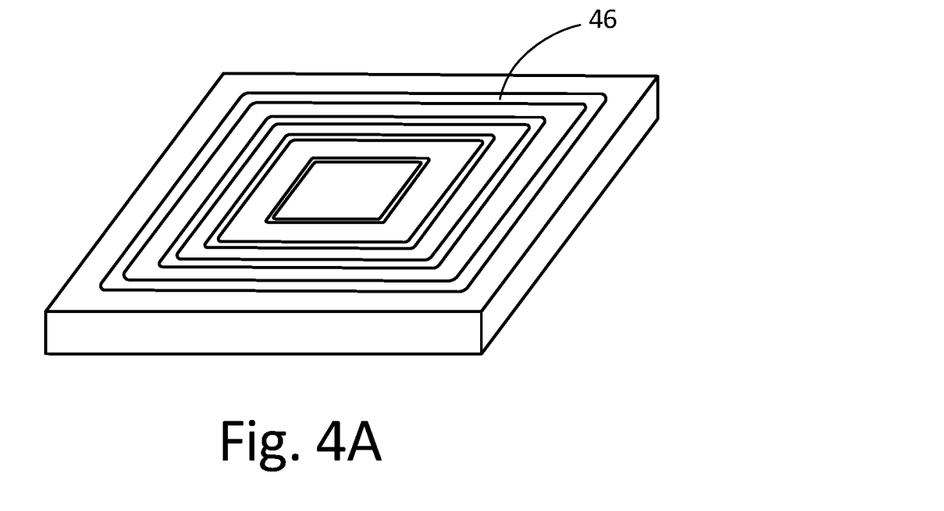
FIGS. 4A-C are schematic drawings of a mechanical lock bond between two polymer components in a recessed blades configuration.
Figure 4B:
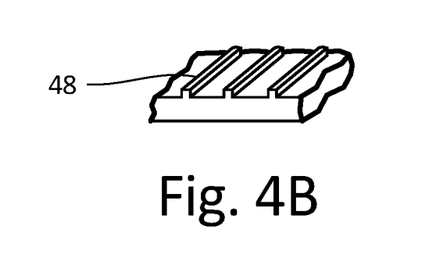
Figure 4C:
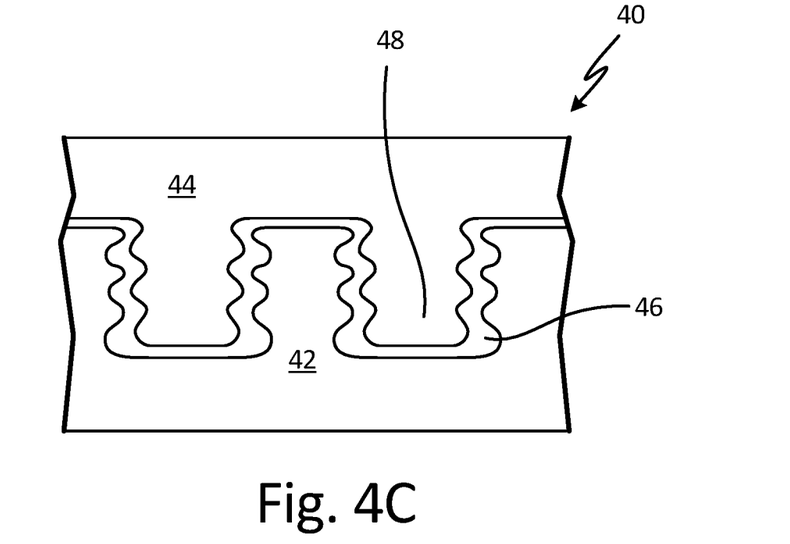

FIGS. 4A-C are schematic drawings of a mechanical lock bond in article 40 between two polymer components in a recessed blades configuration. First polymer component 42 contains recessed blades 46. Second polymer component 44 contains raised blades 48 which are fitted to recessed blades 46 on first polymer component 42. The mating features, recessed blades 46 and raised blades 48, are created through additive manufacturing or 3-D printing. Both raised blades 48 and recessed blades 46 contain complex wall undercut structures. In this embodiment, a concentric pattern on recessed blades 46 on first polymer component 42 creates a mechanical lock with raised blades 48 on second polymer component 44.

Figure 5A:
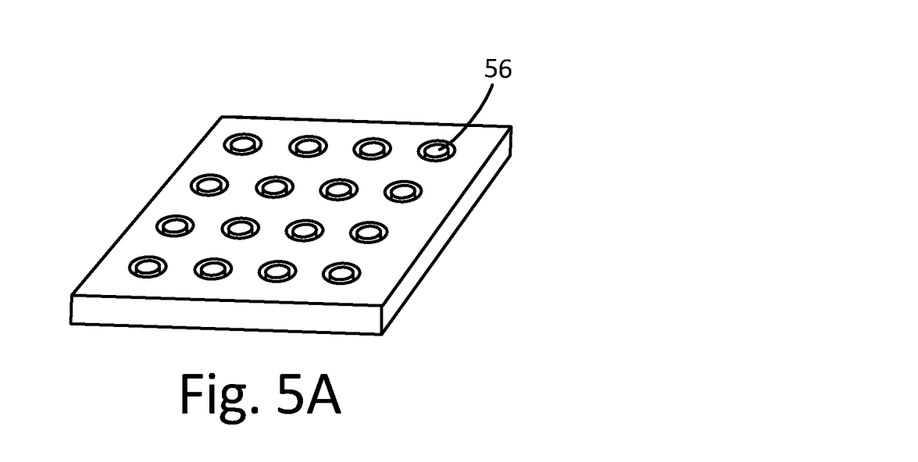
FIGS. 5A-C are schematic drawings of a mechanical lock bond between two polymer components in a ring-blade configuration.
Figures 5B, 5C:
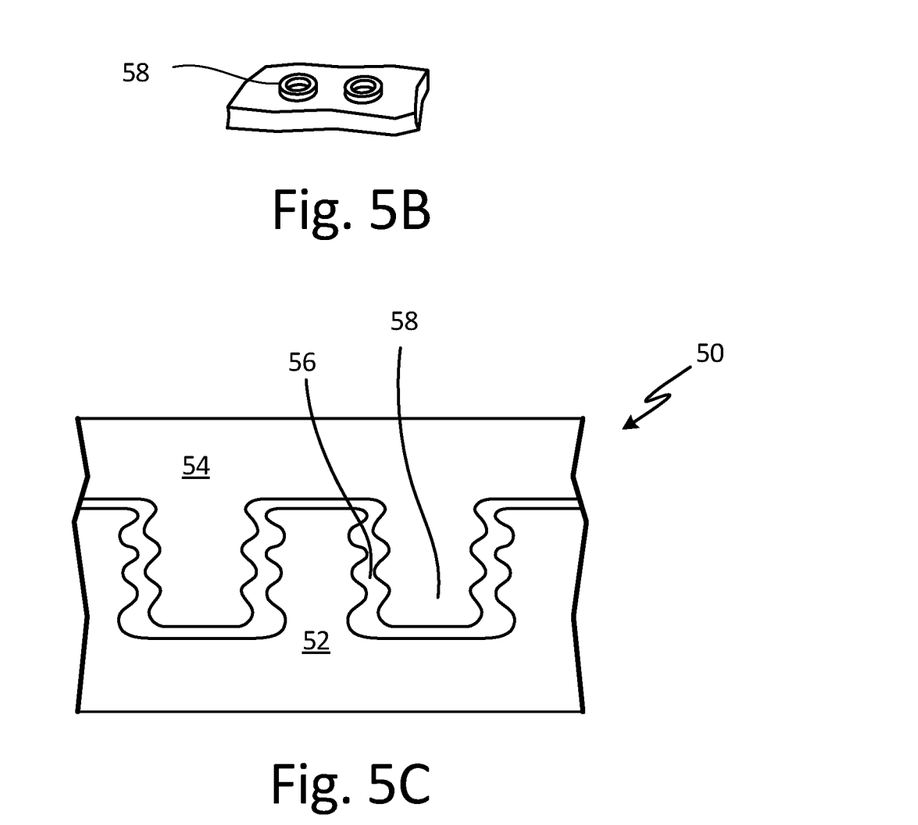

FIGS. 5A-C are schematic drawings of a mechanical lock bond between two polymer components in a ring-blade configuration. Article 50 shows a joint between two polymer components. First polymer component 52 contains a mating feature of recessed rings 56. Second polymer component 54 contains a mating feature of raised rings 58 that fit with recessed rings 56 on first polymer component 52. Recessed rings 56 and raised rings 58 are created through additive manufacturing or 3-D printing. Both raised rings 58 and recessed rings 56 contain complex wall undercut structures. The extended surface area of the complex wall undercut structures helps an adhesive create a strong bond between both first polymer component 52 and second polymer component 54. The combination of an adhesive with mating features 56, 58 and undercuts creates a mechanical lock for polymer components 52, 54.

The proposed bond creates an enhanced joint between polymer components with both a mechanical lock and adhesive for overall durability and longer lifespan. This allows for significant improvement in strength and reliability of adhesive bond joints between difficult to bond materials, such as low energy polymer components.

Additionally, this feature reduces sensitivity of polymer component joints to contamination by reliance on mechanical locking in addition to adhesives. Thus, if an adhesive is degraded through outside contamination such as oil, debris, or dirt, a mechanical lock still holds polymer components in place.

The mechanical locking undercut features further simplify assembly accuracy, due to the self-locating nature of matching undercut features on polymer component surfaces. This is particularly true when a protruding feature is matched with a recessed feature. Overall, this allows for strong, reliable, large polymer structures comprised of multiple small components.

Figure 6:
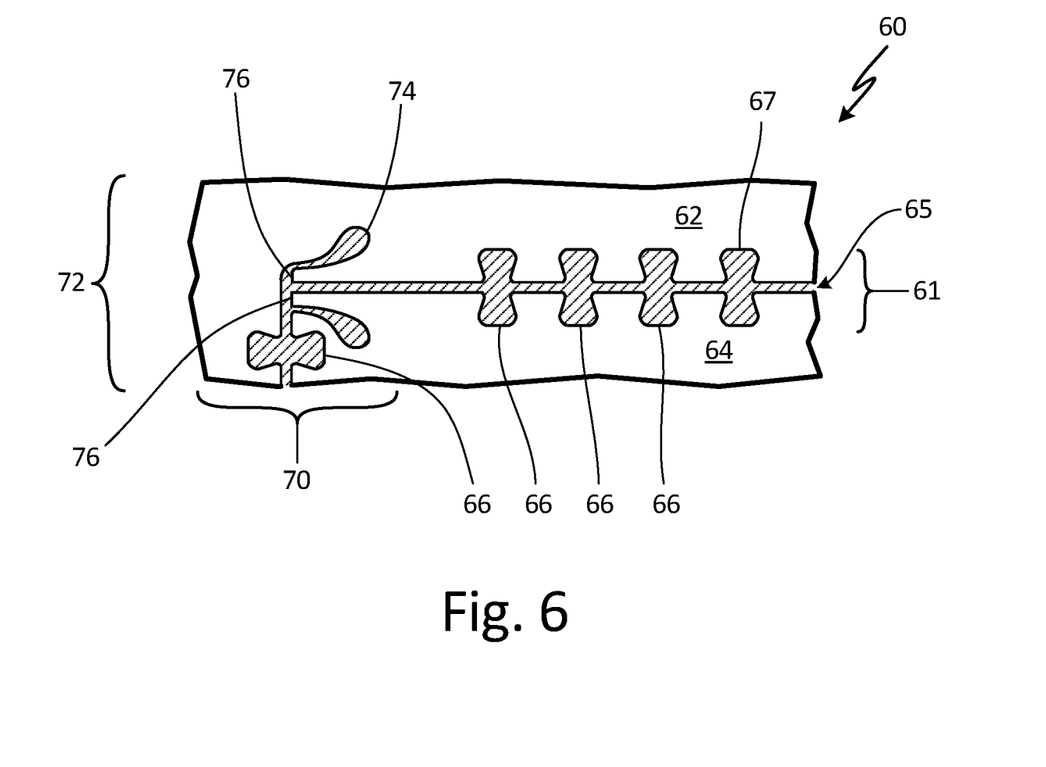
FIG. 6 is a schematic drawing of a peel-resistant edge bond between two polymer components.

FIG. 6 is a schematic drawing of a peel-resistant edge bond between two polymer components. Article 60 includes first polymer component 62 and second polymer component 64, joined by bond 61. Bond 61 includes adhesive gap 65 filled with adhesive 67, and features 66. Bond 61 mechanically locks, working in conjunction with adhesive 67 to maintain a connection between polymer components 62, 64.

Additionally, article 60 contains bumper region 70. Bumper region 70 includes edge protective bumper 72, buried taper 74, and tapered edges 76. Typically, when two or more polymer components are connected with an adhesive, edges of the polymer components "peel" away from each other. Bumper region 70 is designed to prevent edge peel. Tapered edges 76 prevent some peel by avoiding the use of sharp edges on components 62, 64; and bumper 72 further protects polymer components 62, 64 from peeling away from adhesive gap 65 by providing a physical barrier. Buried taper feature 74 reduces stress on bond 61. Overall, article 60 contains the mechanical lock undercut feature that allows for a strong bond and protected edge.

The proposed polymer surface geometry allows for mechanical locking of polymer components in conjunction with an adhesive bond. This configuration strengthens bonding between polymer components, increases lifespan of bonds, and allows polymer component joints to withstand tension, shear, torsion or edge peel forces.

DISCUSSION OF POSSIBLE EMBODIMENTS

The following are non-exclusive descriptions of possible embodiments of the present invention.

A method of bonding polymer components includes additively manufacturing a first polymer component having a first mating feature, additively manufacturing a second polymer component having a second mating feature, the second mating feature designed to fit with the first mating feature, and joining the first and second polymer components with an adhesive to form a mechanical lock wherein the mechanical lock comprises the first mating feature, the second mating feature and the adhesive.

The method of the preceding paragraph can optionally include, additionally and/or alternatively, any one or more of the following features, configurations and/or additional components:

The method includes additively manufacturing an undercut wall structure on the first mating feature.

The method includes additively manufacturing an undercut wall structure on the second mating feature.

Additively manufacturing a first polymer component having a first mating feature comprises additively manufacturing a recess into the first polymer component.

Additively manufacturing a second polymer component having a second mating feature comprises additively manufacturing a protrusion onto the second polymer component, the protrusion configured to mate with the first mating feature.

Additively manufacturing a second polymer component having a second mating feature comprises additively manufacturing a recess into the second polymer component.

Additively manufacturing a first polymer component having a first mating feature comprises additively manufacturing a void space; and wherein additively manufacturing a second polymer component having a second mating feature comprises additively manufacturing a projection, the projection complementing the void space.

Additively manufacturing a first polymer component having a first mating feature comprises additively manufacturing a recessed blade; and wherein additively manufacturing a second polymer component having a second mating feature comprises additively manufacturing a raised blade, the raised blade fitted to the recessed blade.

Additively manufacturing a first polymer component having a first mating feature comprises additively manufacturing a recessed ring; and wherein additively manufacturing a second polymer component having a second mating feature comprises additively manufacturing a raised ring, the raised ring fitted to the recessed ring.

A polymer article includes a first polymer component having a first surface and an edge, the first polymer component comprising a first mating feature on the first surface, a second polymer component having a second surface and an edge, the second polymer component comprising a second mating feature on the second surface, and a mechanical lock between the first polymer component and the second polymer component including. The mechanical lock includes the first mating feature fitted to the second mating feature by an adhesive.

The polymer article of the preceding paragraph can optionally include, additionally and/or alternatively, any one or more of the following features, configurations and/or additional components:

The polymer article includes an undercut wall structure configured to increase the surface area of the first mating feature.

The first mating feature comprises a recess.

The second mating feature comprises a protrusion configured to mate with the first mating feature.

The second mating feature comprises a recess.

The first mating feature comprises a void space and the second mating feature comprises a protrusion.

The first mating feature comprises a recessed blade and the second mating feature comprises a raised blade.

The first mating feature comprises a recessed ring and the second mating feature comprises a raised ring.

The polymer article includes a bumper connected to the edge of the first polymer component and connected to the edge of the second polymer component.

The edges of the first and second polymer components are tapered.

The polymer article includes a first buried taper adjacent to the edge of the first polymer component, and a second buried taper adjacent to the edge of the second polymer component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of bonding polymer components comprises:
    additively manufacturing a first polymer component having a first recess, wherein the first recess includes a first undercut wall structure;
    additively manufacturing a second polymer component having a second recess, the second recess designed to fit with the first recess, wherein the second recess includes a second undercut wall structure;
    additively manufacturing bumper connected to an edge of the first polymer component and connected to an edge of the second polymer component; and
    joining the first and second polymer components with an adhesive by entirely filling the first recess and the second recess with the adhesive to form a mechanical lock wherein the mechanical lock comprises the first recess, the second recess and the adhesive.

2. The method of claim 1, wherein the edges of the first and second polymer components are tapered.

3. The method of claim 1, further comprising additively manufacturing a first buried taper adjacent to the edge of the first polymer component and a second buried taper adjacent to the edge of the second polymer component.

4. A method of bonding polymer components comprises:
    additively manufacturing a first polymer component having a recessed ring;
    additively manufacturing a second polymer component having a raised ring, the raised ring designed to fit with the recessed ring;
    additively manufacturing bumper connected to an edge of the first polymer component and connected to an edge of the second polymer component; and
    joining the first and second polymer components with an adhesive by entirely filling the first recess and the second recess with the adhesive to form a mechanical lock wherein the mechanical lock comprises the recessed ring, the raised ring, and the adhesive.

\* \* \* \* \*